United States Patent
Kocot

(10) Patent No.: US 7,703,076 B1
(45) Date of Patent: Apr. 20, 2010

(54) USER INTERFACE SOFTWARE DEVELOPMENT TOOL AND METHOD FOR ENHANCING THE SEQUENCING OF INSTRUCTIONS WITHIN A SUPERSCALAR MICROPROCESSOR PIPELINE BY DISPLAYING AND MANIPULATING INSTRUCTIONS IN THE PIPELINE

(75) Inventor: Rebecca A. Kocot, Fairview, TX (US)

(73) Assignee: LSI Corporation, Milpitas, CA (US)

( * ) Notice: Subject to any disclaimer, the term of this patent is extended or adjusted under 35 U.S.C. 154(b) by 1917 days.

(21) Appl. No.: 10/664,636

(22) Filed: Sep. 19, 2003

Related U.S. Application Data

(60) Provisional application No. 60/491,480, filed on Jul. 30, 2003.

(51) Int. Cl.
  *G06F 9/44* (2006.01)
(52) U.S. Cl. .................... 717/125; 717/129; 717/124
(58) Field of Classification Search ......... 717/100–135; 712/23, 32, 212, 208, 245; 345/501–506; 703/3, 13–28
  See application file for complete search history.

(56) References Cited

U.S. PATENT DOCUMENTS

| | | | |
|---|---|---|---|
| 4,253,183 A | 2/1981 | Taylor et al. | |
| 5,537,538 A | 7/1996 | Bratt et al. | |
| 5,717,909 A | 2/1998 | Nemirovsky et al. | |
| 5,913,052 A * | 6/1999 | Beatty et al. | 703/15 |
| 6,088,044 A | 7/2000 | Kwok et al. | |
| 6,192,465 B1 * | 2/2001 | Roberts | 712/212 |
| 6,493,868 B1 * | 12/2002 | DaSilva et al. | 717/105 |
| 6,567,924 B1 | 5/2003 | McGee et al. | |
| 6,784,889 B1 * | 8/2004 | Radke | 345/531 |
| 2002/0130871 A1 * | 9/2002 | Hill et al. | 345/467 |
| 2003/0051228 A1 * | 3/2003 | Martinez et al. | 717/109 |
| 2003/0061468 A1 * | 3/2003 | Gupte et al. | 712/218 |
| 2003/0110476 A1 * | 6/2003 | Aihara | 717/135 |
| 2004/0111594 A1 * | 6/2004 | Feiste et al. | 712/245 |

OTHER PUBLICATIONS

Stolte et al., "Visualizing Applicatio Behavior on Superscalar Processors," IEEE, Oct. 1999.*

* cited by examiner

*Primary Examiner*—Insun Kang

(57) ABSTRACT

A graphics rendering engine within a software development tool is used to perform software debug operations by analyzing the status of instructions within various stages of a superscalar processor pipeline. The debug operations are carried out using code breakpoints selected by a user through a graphical user interface. Once a line of code is selected, the processor pipeline can be examined by designating a highlighted color, for example, for certain stages and corresponding instructions that will proceed to the next stage, and not designating stages and corresponding instructions that will not proceed. This allows a user to visually examine the efficiency of the instruction throughput at select regions in the sequence of instruction addresses. Armed with the information, a user can then modify the sequence if desired.

19 Claims, 5 Drawing Sheets

*bp = (*bp & rm[offset]) | ((cd<<offset) & mask) ← 50

```
1:   const    tmp1,mask           ;load mask
2:   consth   tmp1,mask
3:   sll      tmp2,cd,offset      ;cd<<offset
4:   and      tmp2,tmp1,tmp2      ;(cd<<offset) & mask
5:   const    tmp1,_rm            ;base address rm
6:   consth   tmp1,_rm
7:   add      tmp1,tmp1,offset    ;address of rm[offset]
8:   load     tmp1,(tmp1)         ;rm[offset]
9:   load     bp,(&bp)            ;*bp
10:  and      tmp1,bp,tmp1        ;*bp & rm[offset]
11:  or       tmp1,tmp1,tmp2      ;final expression
12:  store    tmp1,(&bp)          ;assign *bp
```
} 52

54

| Decode | | | | Execute | | | | | Writeback | | |
|---|---|---|---|---|---|---|---|---|---|---|---|
| I0 | I1 | I2 | I3 | ALU1 | ALU2 | SHF | LS | BRN | R1 | R2 | Cycle |
| 1:const | 2:consth | 3:sll | 4:and | | | | | | | | 1 |
| 5:const | 6:consth | 7:add | 8:load | 1:const | | 3:sll | | | | | 2 |
| 9:load | 10:and | 11:or | 12:store | | 2:consth | | | | 1 | 3 | 3 |
| | | | | 4:and | 5:const | | | | 2 | | 4 |
| | | | | 6:consth | | | | | 4 | 5 | 5 |
| | | | | 7:add | | | | | 6 | | 6 |
| | | | | | | | 8:load | | 7 | | 7 |
| | | | | | | | 9:load | | | | 8 |
| | | | | | | | | | 8 | | 9 |
| | | | | 10:and | | | | | 9 | | 10 |
| | | | | 11:or | | | | | 10 | | 11 |
| | | | | | | | 12:store | | 11 | | 12 |

FIG. 3

| Stage | Issue 1 | Issue 2 | Issue 3 | Issue 4 |
|---|---|---|---|---|
| Write Back | None | None | None | None |
| Execute | 0x1000 | 0x1001 | 0x1002 | 0x1003 |
| Memory 1 | 0x1006 | 0x1007 | 0x1008 | None |
| Memory 0 | 0x100A | None | None | None |
| Address Generation | 0x100B | 0x100D | 0x100F | 0x1011 |
| Read Data | None | None | None | None |
| Grouping | 0x1013 | 0x1014 | 0x1015 | 0x1016 |
| Fetch/Decode | 0x1017 | 0x1018 | 0x1019 | None |

60 ⬈

| 11 cycles | 0xfff  |    |          |       |              |         |
|-----------|--------|----|----------|-------|--------------|---------|
|           | 0x1000 |    | ; nop    |       |              |         |
| ---       | 0x1001 | EX | _start:: | mov   | r9,          | 2       |
| ---       | 0x1002 | EX | ;        | mov   | r10,         | 0xff00  |
| ---       | 0x1003 | EX | ;        | mov   | r11,         | 0xf0f0  |
| ---       | 0x1006 | M1 | ;        | mov   | r2,          | r9      |
| ---       | 0x1007 | M1 | ;        | mov   | r3,          | r9      |
| ---       | 0x1008 | M1 | tst_bgn: | mov   | r13,         | 0x14    |
| ---       | 0x100a | M0 | ;        | xor.e | r0,          | r0      |
| ---       | 0x100b | AG | ;        | mov   | g0,          | r0      |
| ---       | 0x100d | AG | ;        | mov   | %loop0,      | 0x1c    |
| ---       | 0x100f | AG | ;        | mov   | r8,          | 0x3d    |
| ---       | 0x1011 | AG | ;        | mov   | r12,         | 0x0     |
| ---       | 0x1013 | GR | lp_calc: | ldu   | r4,          | r12, +1 |
| ---       | 0x1014 | GR | ;        | ldu   | r6,          | r8, +1  |
| ---       | 0x1015 | GR | ;        | mac   | r0,          | r4, r6  |
| ---       | 0x1016 | GR | ;        | ldu   | r5,          | r12, +1 |
| ---       | 0x1017 | FD | ;        | ldu   | r7,          | r8, +1  |
| ---       | 0x1018 | FD | ;        | mac   | r0,          | r5, r7  |

TARGET DISASSEMBLED CODE

FIG. 5

Disassembly 469 cycles

| | | TARGET DISASSEMBLED CODE | | |
|---|---|---|---|---|
| 0x1e0 | --- | : | std | r4, a7, 0x5 |
| 0x1e1 | --- | : | ldd | r2, a7, 0x1 |
| 0x1e2 | --- | : | mov | a6, a7 |
| 0x1e3 | --- | : | add | a6, 3 |
| 0x1e4 | --- | : | ldd | r4, a6 |
| 0x1e5 | --- | : | mov.e | a1, r2 |
| 0x1e6 | --- | : | mov.e | a0, r4 |
| 0x1e7 | --- | : | ld | r6, a0 |
| 0x1e8 | --- | : | st | r6, a1 |
| 0x1e9 | --- | : | ld | r6, a1 |
| 0x1ea | --- | : | iadd.e | r4, 1 |
| 0x1ec | --- | : | std | r4, a6 |
| 0x1ed | --- | : | iadd.e | r2, 1 |
| 0x1ef | --- | : | std | r2, a7, 0x1 |
| 0x1f0 | --- | : | cmp | r6, 0 |
| 0x1f1 | --- | : | bnz | 0x1e1 |
| 0x1f2 | --- | : | ldd | a0, a7, 0x5 |
| 0x1f3 | --- | : | add | a7, 6 |
| 0x1f4 | --- | _FUNC_EXIT_strcpy:: | ret | |
| 0x1f5 | --- | write sdsp:: | pushd | r10, a7 |

FIG. 6

USER INTERFACE SOFTWARE DEVELOPMENT TOOL AND METHOD FOR ENHANCING THE SEQUENCING OF INSTRUCTIONS WITHIN A SUPERSCALAR MICROPROCESSOR PIPELINE BY DISPLAYING AND MANIPULATING INSTRUCTIONS IN THE PIPELINE

PRIORITY APPLICATION

This application claims priority to provisional application Ser. No. 60/491,480 entitled GRAPHICAL DISPLAY OF PROCESSOR PIPELINE STAGE, filed Jul. 30, 2003 by Rebecca A. Kocot.

BACKGROUND OF THE INVENTION

1. Field of Invention

This invention relates to computer program development and, more particularly, to the use of a code breakpoint manipulated by a user to extract information on which instructions within various stages of a superscalar microprocessor pipeline will progress to succeeding stages during a particular moment in time (i.e., clock cycle), in order to possibly modify the pipeline sequence for enhancing microprocessor instruction throughput.

2. Description of Related Art

The following descriptions and examples are not admitted to be prior art by virtue of their inclusion within this section.

A typical microprocessor or "processor" involves various functional units that receive instructions from, for example, memory and operate on those instructions to produce results stored back into the memory or dispatched to an input/output device. There are many types of processors available in the market. For example, processors can be classified as either CISC or RISC processors. In addition, processors can implement multiple stages in a pipeline and can implement, possibly, numerous pipelines through the functional units.

Depending on how the pipeline is configured, it is generally desirable to arrange the instruction addresses of the program in a particular sequence. If properly sequenced, the instructions can be carried out as steps which proceed as successive stages through the pipeline to produce an efficient instruction throughput. In order to enhance throughput, it is often desirable to implement multiple pipelines in parallel so that two or more instructions can be fed through the functional units simultaneously. Placing multiple instructions through a pipeline in unison (i.e., during the same clock cycle) is generally known as "superscalar," and processors which employ the superscalar concept are known as superscalar processors.

A problem inherent to pipelined processors and especially superscalar processors is the data/procedural dependencies and resource conflicts that will occur when attempting to execute instructions in a given sequence. For example, data dependency will exist if a superscalar processor attempts to execute two instructions at the same time when, in fact, the execution of the second instruction should be delayed until the first instruction produces its value. In addition to data dependencies, superscalar processors also encounter procedural dependencies that often occur whenever the instruction sequence encounters a branch instruction. For example, instructions which follow a given branch instruction have a procedural dependency on each branch that has been executed up to that point. In addition, resource conflicts arise in superscalar processors when two instructions must use the same resource at the same time (e.g., two instructions being fetched or executed within the same clock cycle).

Attempts have been made to resolve many of the inherent dependencies and conflicts that arise in superscalar processors. For example, such processors might use look-ahead buffers, prefetch buffers, and reorder buffers in an attempt to adjust the sequence at which instructions are dispatched to the various functional units. This form of reordering typically occurs within the hardware elements of the processor itself. Other techniques might involve actually rewriting the object code before the code is stored in the memory device associated with the processor.

In the latter instance in which software is rewritten, many tools might be used during development of the software to optimize the sequencing of the instructions. These tools will take into account the particular architecture of the processor involved and, thereby, arrange the instruction sequence so that the throughput of instructions within the pipeline is maximized. These tools are often referred to as "integrated development tools" which are used to configure, build, and debug programs used by a particular processor.

As the software is being developed, the debugging feature will often schedule the sequence of instructions without attention paid to the pipeline structure of the processor. Unfortunately, a developer using such a tool cannot readily modify the sequence of instructions depending on where an instruction exists within the processor pipeline at any given time. Absent being able to visualize the whereabouts of each instruction within a pipeline, a developer will be unable to optimize the pipeline throughput. Even further, absent any way to visualize whether a particular instruction will progress to the next stage in the pipeline, a developer cannot know whether the pipeline flow is optimized.

SUMMARY OF THE INVENTION

The problems outlined above are in large part solved by one or more embodiments of the present invention. A graphics rendering engine, a software development tool, and a methodology are described for visualizing various instructions within a processor pipeline. The processor is preferably a superscalar processor and provides for parallel movement of multiple instructions in unison through each stage of the pipeline.

The graphical illustration of the various instructions within a superscalar processor pipeline is represented essentially as a table. Various rows and columns of the table are shown and can be accessed by a user via a pointing device, such as a keyboard or mouse. By selecting a breakpoint field within one column of the graphical rendering, the current instruction within the corresponding row will be highlighted along with the clock cycle number at which that instruction occurs within the corresponding stage shown. All other instructions within the instruction sequence for that clock cycle are also shown. In addition, the instructions of that cycle which will progress to the succeeding stage will be highlighted with a color corresponding to the stage in which each instruction exists.

If the instruction will not progress to the succeeding stage due to data dependencies, procedural dependencies, or resource conflicts, for example, such instructions will not be highlighted. In this manner, the graphical rendering will show not only the current instructions within the pipeline at a particular clock cycle, but also all such instructions that will proceed to the next stage. If significant dependencies or conflicts occur, then there will be relatively few instructions that are highlighted for a given cycle. This might indicate possible ways to re-sequence the instructions to achieve more highlighted instructions for that cycle. The re-sequencing forms part of a debugging operation which is part and parcel to the overall software development.

According to one embodiment, a graphics rendering engine is provided. The engine includes a sequence of instruction addresses adapted for display upon a screen accessible to a user. In addition, a sequence of processor pipeline stages are attributed to respective ones of the sequence of instructions. During times when a user selects one of the instruction addresses by, for example, selecting a breakpoint field, the screen will display a designator and a non-designator for select ones of the sequence of instructions. The designated instruction will note that it will proceed to a succeeding stage during a next clock cycle, whereas the non-designated instruction will note that it will not proceed to a succeeding stage during the next clock cycle.

When used as a software development tool, the graphics rendering engine not only includes a breakpoint field, but also includes an instruction address field and a scheduler. The instruction address field can be used to select a particular instruction within the sequence and move that instruction to another location within the sequence. A scheduler can then receive the newly formed second sequence of instructions that will hopefully have a higher instruction throughput than the first sequence of instructions.

According to another embodiment, a method can be employed. The method is used for displaying the progression of instruction addresses through a processor pipeline. The method includes selecting a breakpoint within a breakpoint column or field of a display screen. By selecting the breakpoint, an instruction address at the same line as the breakpoint is selected. In addition, a clock cycle is selected where the clock cycle is that in which the selected instruction address occurs within a particular stage of the pipeline. All instruction addresses within the processor pipeline that will proceed to the succeeding stage of the pipeline are then designated. Conversely, all instruction addresses within the processor pipeline that will not proceed to the succeeding stage are not designated. By selecting the breakpoint on a particular instruction address and choosing an associated clock cycle, all addresses within that clock cycle that will proceed will thereafter be noted on the screen with a particular color different from the background of the screen itself.

BRIEF DESCRIPTION OF THE DRAWINGS

Other objects and advantages of the invention will become apparent upon reading the following detailed description and upon reference to the accompanying drawings in which:

FIG. 3 is a diagram showing an exemplary progression of software development from a high-level code to a lower-level assembly code, and how the sequence of assembly language instructions dispatched at four issues per cycle proceed through the functional units of the superscalar processor shown in FIG. 1;

FIG. 5 is a pop-up window produced from a graphics rendering engine executable upon the superscalar processor and, when a user selects a breakpoint in the assembly code, the engine will show the sequence of FIG. 4 within the various stages that are active and which will proceed to the succeeding stages of the pipeline;

FIG. 6 is another pop-up window showing the same instruction address in two stages, with only one stage of the two being currently active during the breakpoint upon a selected cycle.

Figure 1:
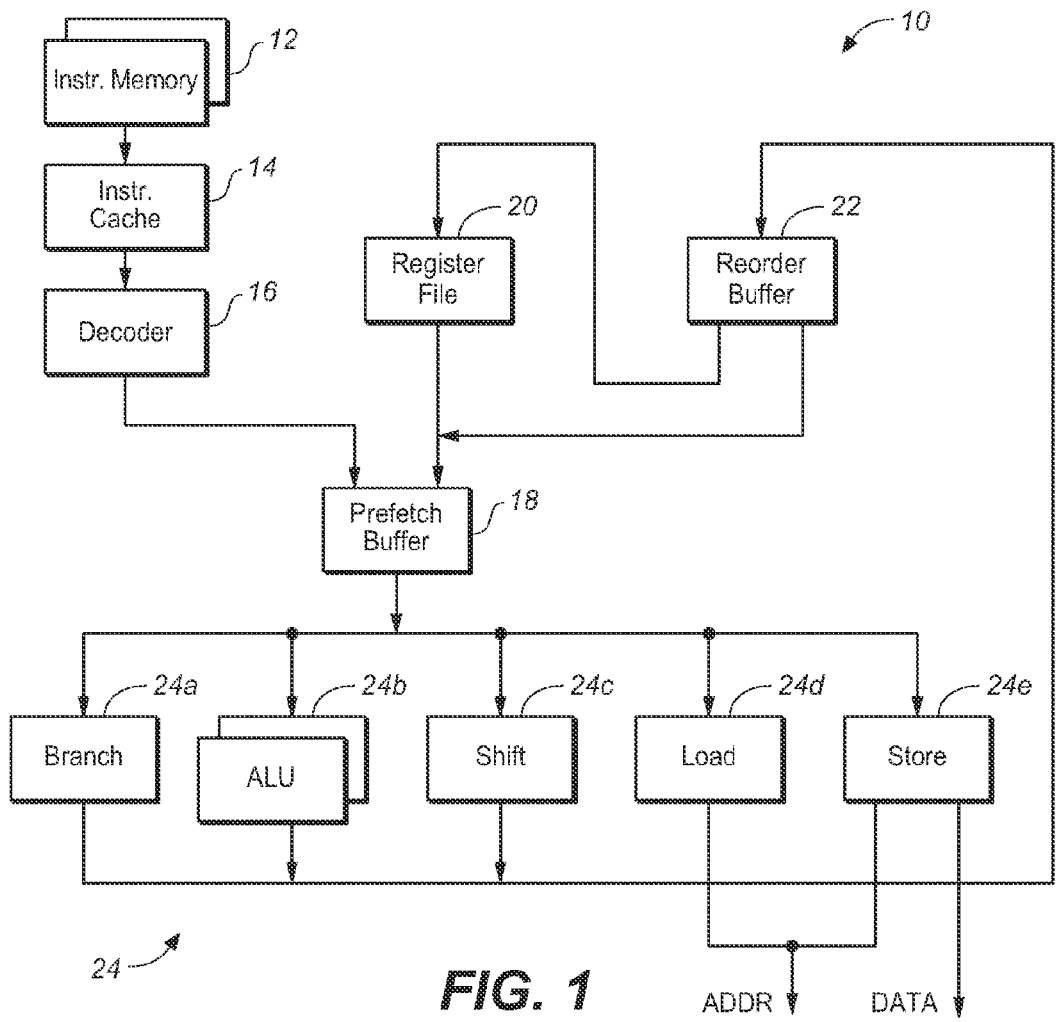
FIG. 1 is a block diagram of instruction flow into functional units of a superscalar processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now the drawings, FIG. 1 illustrates in part the architecture of a superscalar processor 10. A processor generally incorporates two major operational units: an integer unit and a floating-point unit. These units communicate data via a data cache and data memory, and the integer and floating-point units are controlled by a single instruction stream supplied by an instruction memory 12. Instruction cache 14 typically supplies multiple instructions per fetch and the actual number of instructions fetched can vary. As the instructions are dispatched from instruction cache 14, decoder 16 decodes those instructions and places them into a prefetch buffer 18.

Prefetch buffer 18 works in conjunction with register file 20 and reorder buffer 22 to handle both in-order and out-of-order issues into functional units 24. While it is generally easy to provide the required instruction bandwidth for sequential instructions because prefetch buffer 18 can simply fetch several instructions per cycle in blocks of multiple instructions, it is much more difficult to provide instruction bandwidth in the presence of non-sequential fetches caused by, for example, branches. Thus, branches impede the ability of the processor to fetch instructions efficiently; therefore, reorder buffer 22 is needed.

Reorder buffer 22 works in conjunction with branch prediction techniques to align and merge back into the sequence of instructions various out-of-order instruction issues. The branch prediction can occur either in hardware or in software by essentially predicting the outcomes of branches during instruction fetching without waiting for the functional units to indicate whether or not the branches should be taken. Prefetch buffer 18 functions to hold all un-issued instructions regardless of the functional units (e.g., branch functional unit 24*a*, ALU functional unit 24*b*, shift functional unit 24*c*, load functional unit 24*d*, and store functional unit 24*e*) that execute the instructions. While only the integer functional units are shown, prefetch buffer 18 may be duplicated in the floating-point unit, depending on the implementation of the FPU.

The sequencing of instructions presented to prefetch buffer 18 is preferably optimized. One way to optimize those instructions is to minimize the amount of out-of-order issues by taking into account dependencies and conflicts that exist within functional units 24. The assembly code presented to an assembler typically is not optimized.

Figure 2:
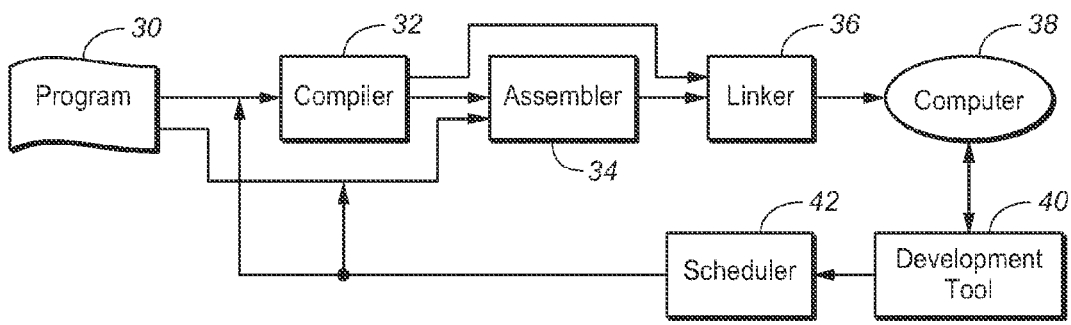
FIG. 2 is a flow diagram of software development from a relatively high-level program language source code to assembly code scheduled for execution by a computer.

FIG. 2 illustrates the development of software from its inception to the final machine-coded language of binary 1's and 0's. When a program is written in fairly high-level code, humans can generally understand the intent of that code if the programming language is understood. A program 30 can be written at a fairly high level of abstraction which, while conducive to a human observer, cannot instruct a computer in its operation absent some reduction in that level of abstraction. Thus, a compiler 32 might be used to produce machine language either directly or through use of an assembler 34.

While a compiler can take the high-level program directly into binary instructions, an assembler typically translates assembly language into binary instructions. As defined herein, assembly language is the symbolic representation of a computer's binary encoding or machine language. Generally speaking, assembly language name operating codes and memory specifiers in a way that humans can read and understand. In addition, assembly language permits software developers to use labels to identify and name particular memory words that hold instructions for data. Once the high-level language (such as C or Pascal) is reduced to a machine language, a linker 36 serves to merge files that may have been separately compiled or assembled. The linked files are then presented to computer 38 as a sequence of binary 1's and 0's.

In order to optimize sequence of instructions presented to computer 38, a software development tool 40 can be used to draw upon the compiled instruction sequence. As the sequence is being executed by computer 38, development tool 40 will render a graphical output described below. The graphical output can be examined on an instruction-by-instruction basis to essentially freeze a machine cycle and examine the instructions within the pipeline. Based on that outcome, a user might then reorder the sequence to produce a second sequence within scheduler 42. Scheduler 42 then reconciles the assembly code placed into compiler 32 or assembler 34 as shown.

Turning now to FIG. 3, a problem associated with improper sequencing is illustrated. To better understand the benefit of software scheduling through use of the present graphics rendering engine and software development tool, FIG. 3 is presented. For example, a C source language statement 50 can be formulated into an assembly language sequence 52. Any instruction set might be employed that would differ from the exemplary instruction set shown. Reference numeral 54 illustrates how this sequence of instructions 52 is executed by the superscalar processor, assuming the coded sequence is aligned in memory so that the first instruction in the sequence is the first position of the decoder. Only three stages are shown: decode, execute, and writeback for sake of brevity and clarity. However, it is recognized that more than three stages are certainly present within a pipeline as will be described below.

While the entire sequence can be fetched and decoded in three cycles, 11 cycles are required for execution. As shown, instruction 5 is not decoded until the second cycle, even though it is independent of preceding instructions and does not begin execution until the fourth cycle. The reason for the decode-to-execution delay could be due to instruction 5 conflicting with instruction 2 for the functional unit ALU2. Of course, there are other problems and inefficiencies occurring in the execution stage. If scheduling were properly employed, the instruction sequence 5-12 can be begun in the first execution cycle, and will not encounter conflicts for functional units that increase execution time by moving instruction 5 to cycle 2, for example, scheduling can save approximately three cycles in the execution time of the illustrated code sequence. However, in order to visualize the inefficiencies within a particular stage, not only must the stage be shown, but also the various instructions within that stage. Accordingly, a graphics rendering engine and methodology is needed as described in FIGS. 4-7.

Figures 4, 7:
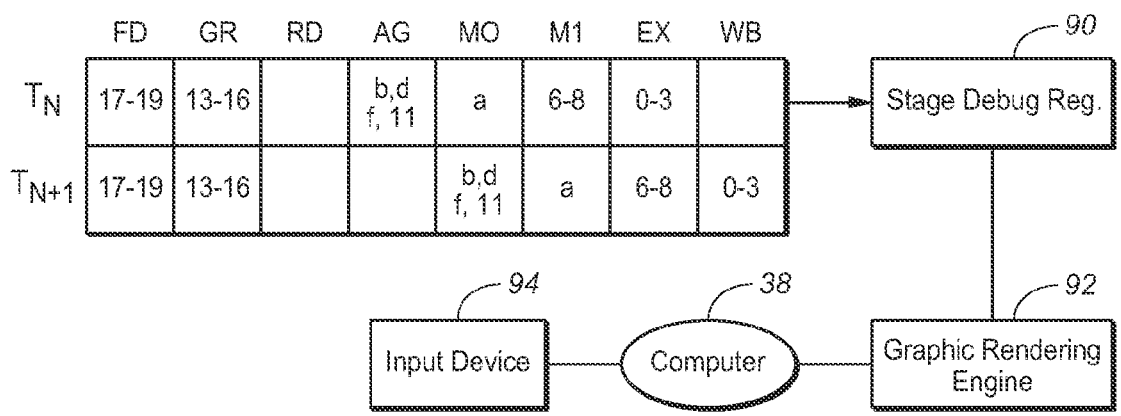
FIG. 4 is a table of assembly language instructions scheduled within eight stages of a superscalar processor pipeline having four issues per cycle.
FIG. 7 is a conceptual diagram of a stage debug register used to store all instructions that are currently active, and a graphics rendering engine for showing the windows of FIG. 5 or 6 depending on which instruction address is selected, and the corresponding cycle.

Turning now to FIG. 4, eight stages are shown for a superscalar processor having four issues per cycle; such processor possibly being the ZSP 500 Digital Signal Processor (DSP) manufactured by LSI Logic Corporation. In the exemplary table 60 shown, instruction addresses appear as hexadecimal binary values, with several stages not containing instructions, i.e., a "nop" condition. While the pipeline shown in table 60 indicates eight stages, the present invention contemplates either more or less than eight stages as well as more or less than four issues per clock cycle. FIG. 4 is shown merely as an example and the sequence of instructions shown with particular address numbers can be modified without departing from the spirit and scope of the present invention.

FIG. 5 illustrates the exemplary table 60 of FIG. 4 placed within a sequence of instructions 62 and displayed as a graphics output 64 of a graphics rendering engine hereof. The graphics output 64 can be presented as a window or screen shot having various fields which can be selected by a user through a pointing device, such as a mouse or keyboard. Window 64 is shown to include five columns. Column 66 is a breakpoint area in which developers can select a particular line or field as a navigation breakpoint by clicking the mouse on the line of interest. In the example shown, the second line of column 66 is highlighted as being selected by a user. The highlighted field 67 can be highlighted with a particular color. Column 62 is described earlier as the addresses in memory for the lines of disassembled assembly code. Column 68 shows the pipeline stages for each of the lines of disassembled code. For example, the instruction addresses 0x1000-0x1003 are within the execution stage of the processor pipeline, wherein the instruction at address 0x1002 can be a 32-bit instruction and thereby occupies addresses 0x1002 and 0x1003. The same can apply to address 0x1004. The pipeline information is shown presented for each line of assembly code. The ordering of instructions in the pipeline stages is presented in the context of the developer's code rather than in the context of the pipeline itself.

A color code is preferably used to indicate the validity of each of the instructions for the pipeline. If the color code is shown over the pipeline stage indicators in column 68, then the pipeline operated on those instructions successfully. The successful operation will be noted as a promotion of the corresponding instructions from the stage indicated to the next stage in the pipeline. The promotion or progression to the next pipeline stage will occur in the next clock cycle. For example, instruction addresses 0x1000-3, 0x1006-8, 0x100a, b, d, f, and 0x1011 have their corresponding pipeline stages highlighted with a particular color to indicate that these instructions have been operated on in those stages and will be moved to the next stage in the pipeline. These colored stage identifiers are, therefore, designated to proceed to a succeeding stage, whereas the non-colored stage numbers indicate instructions which will not move to the succeeding stage. The non-designated instruction addresses are 0x1013-18 in the example of FIG. 5. Thus, for example, instruction 0x0113-15 will not move from stage GR to the next Read Data stage (RD) during the cycle shown.

Within the upper portions of window 64 is a title for window 64 as well as two additional fields 70 and 72. Field 70 indicates the current clock cycle corresponding to the instruction 0x1000 selected by breakpoint field 67. More specifically, field 70 shows the particular clock cycle encountered when instruction 0x1000 is within the execute stage of the pipeline. As instruction 0x1000 is within the execute stage, all of the other designated instructions are in the corresponding highlighted stages during the 11th clock cycle. Thus, field 70 indicates the current clock cycle. Field 72 allows a developer to request another area of memory by entering the address into the text box of window 64. Thus, a developer can go directly to a particular instruction address if that address is entered by a user via, for example, a keyboard. In addition to columns 66, 62, and 68, two additional columns can be shown. For example, column 74 indicates the labels placed by the developer in the code. Column 76 can show the disassembled instructions as op code and operands.

The current execution line can be highlighted in any color, for example, yellow. This will show the instruction to be executed next. When cycle-stepping through the assembly code, multiple instructions are potentially executed in each step. This is due to the nature of the superscalar processor. The current execution line will advance by the number of instructions executed in the previous step. For the code shown in FIG. 5, a cycle step will show the results of instructions at address 0x1000-3. When instruction-stepping through the assembly code, the software developer can observe only the results of the instruction currently highlighted in yellow. This may be a step of less than one cycle in processor time. In this case, the simulation is advanced by the results of the instruction while the cycle count will be unchanged.

The presentation of pipeline information in the context of the developer's code and the color coding of the active pipeline stages streamlines the development process and allows the software developer to focus on application development rather than searching for pipeline information elsewhere in the GUI. The graphical output in the GUI format can be implemented in various scripting languages. Popular scripting languages include Perl and Tool Command Language/Toolkit, oftentimes referred to as "TCL/TK." TCL/TK is an interpreted language with programming features available across multiple platforms running Unix, Windows, and the Apple Macintosh operating systems. When operating within the TCL/TK framework, the graphics rendering engine hereof can produce the GUI output 64 shown in FIG. 5, when executing the following TCL/TK code. This implementation presents the disassembled view using a TK table object with text tags used for coloring.

```
::itcl::body DisassembleMemory::showPipeline { } {
    if {$zsimmode} {
    set ans [eval [::itcl::code ${parent} \
    sendsdbug "zsim print-pipe" ]]
    # add pipeline information
    set count [$tablepath cget –rows]
    for {set i 0} {$i<$count} {incr i} {
    set tabledata($i, 2)
    }
    foreach w [winfo children $tablepath] {
    destroy $w
    }
    # get first pound sign
    set pos1 [string first "#" $ans]
    incr pos1
    # get second pound sign
    set pos2 [string first "#" $ans $pos1]
    incr pos2
    # get third pound sign
    set pos [string first "#" $ans $pos2]
    # cycles is between second and third pound sign
    set cyclevalue [string range $ans $pos2 [expr $pos−1]]
    $cycles configure-text "$cyclevalue cycles"
    # the rest is after the third pound sign
        set answer [string range $ans [expr $pos+1] end]
        set lines [split $answer "#"]
    set colwidth 0
    set last_displaytext " "
        foreach ln $lines {
            set word [split $ln ":"]
    # catch empty lines or newlines
    if {[string trim [lindex $word 0]]==" "} {
       continue
    }
       # get the line
       if {[lindex $word 0] !="rule"} {
    set temp [lindex $word 3]
    set address [lindex $word 3]
    if {[array names rows $address] !=" "} {
       set row $rows ($address)
       set wpath $tablepath.$row
       if {![winfo exists $wpath]} {
          # create the text window to hold the pipeline
          # info for this address
          text $wpath
          ${parent}_colors standardize $wpath
          $wpath configure-borderwidth 0
       }
    } else {
       continue
    }
    set displaytext [lindex $word 0]
    if {$displaytext !=$last_displaytext} {
       # make a new tag
       switch $displaytext {
          "F" {
             set bg LightPink
             set fg black
          }
          "FD" {
             set bg LightPink
             set fg black
          }
          "G" {
             set bg siennal
             set fg black
          }
          "GR" {
             set bg siennal
             set fg black
          }
          "R" {
             set bg khaki2
             set fg black
          }
          "RD" {
             set bg khaki2
             set fg black
          }
          "AG" {
             set bg gold3
             set fg black
          }
          "M0" {
             set bg DarkoliveGreen3
             set fg black
          }
          "M1" {
```

```
      set bg PaleGreen3
      set fg black
   }
   "EX" {
      set bg PaleGreen
      set fg black
   }
   "E" {
      set bg PaleGreen
      set fg black
   }
   "WB" {
      set bg SkyBlue
      set fg black
   }
   "W" {
      set bg SkyBlue
      set fg black
   }
  }
 }
}
   $wpath tag configure ${displaytext}tag \
-foreground $fg \
-background $bg
set startpos [$wpath index "1.0"]
set endpos 1. [string length $displaytext]
$wpath insert 1.0 $displaytext
set charwidth [lindex [split [$wpath index "1.0 lineend"].]
   1]
incr charwidth 2
$wpath configure-width $charwidth
if {$charwidth>$colwidth} {
   $tablepath width 2 $charwidth
   set colwidth ${charwidth}
   }
set last_displaytext $displaytext
# sixth word is flag for success . . .
set success 1
set success [lindex $word 6]
if {$success} {
$wpath tag add ${displaytext}tag $startpos $endpos
   }
foreach w [winfo children $tablepath] {
set row [lindex [split $w.] end]
$w configure-relief flat
$w configure-state disabled
$w configure-takefocus 0
$w configure-highlightthickness 0
$tablepath window configure $row, 2-window $w
   }
  }
 }
}
```

FIG. 6 illustrates another window 80 which would occur much later in the sequence of instructions. In fact, window 80 indicates the selected instruction 0x1e6 within M1 stage occurs at the cycle number 469. In addition to instruction 0x1e6 being at stage M1, instruction 0x1e6 is also in stage FD. As shown, however, instruction 0x1e6 will progress from stage M1 to the next stage EX, but will not progress from it also being at stage FD to the next stage GR.

FIG. 6 shows a classic example of a loop initiated by the branch not zero command (bnz) at instruction step 0x1f1. In the previous instruction step 0x1f0, a compare operation occurs in which the contents of a register number 6 are compared and at each iteration of the loop, the contents are decremented by 1. Once the contents achieve 0, then the succeeding branch instruction will not occur. Thus, instead of branching back to instruction address 0x1e1, the next instruction will be a load instruction ldd as shown. By performing a branch instruction, the entire pipeline from 0x1e1-0x1f1 is within the loop. Importantly, however, at instruction 0x1e5, that instruction will not progress past the fetch decode stage (FD) since it is undergoing a writeback (WB). Simply put, the instruction cannot be fetched from memory if memory is being written to. Likewise for instruction 0x1e6, an instruction cannot be simultaneously fetched from memory if it is being read from memory (M1). By not highlighting the fetch stages of instructions 0x1e5-7, the fetch cycles most likely will be dispatched in the next clock cycle (469+1).

Referring to FIGS. 5 and 6, the instruction address of interest is selected by activating the breakpoint field, column 66 of FIG. 5. Once activated, the corresponding row can be highlighted with, for example, a yellow designator. In addition, the current clock cycle will be shown at field 70 of FIG. 5 and each stage in column 68 (FIG. 5) that is currently active (i.e., the corresponding instruction will be sent onward to the next stage) will be highlighted with a color. That color will correspond to the stage designator. For example, stage FD can be designated as a light pink color; stage WB can be designated as a sky blue color; stage M1 can be designated as a pale green color; stage M0 can be designated as a dark olive green color; stage AG can be designated as a gold color, stage RD can be designated a khaki color; and stage GR can be designated a sienna color. Those colors are shown in the exemplary code listing set forth above. Obviously, the designator colors can be modified to suit the user provided those colors will appear distinguishable from the background color of the window.

FIG. 7 illustrates one mechanism in which the instructions of FIG. 5 can be noted as active. For example, using the same instruction addresses as FIG. 5, those instructions which will progress from cycle $T_N$ to cycle $T_{N+1}$ are at stages AG, M0, M1, and EX. Stages FD and GR contain respective addresses that will not be marked as active since they will not progress to the next stage, as shown. Those instructions which will progress and, therefore, are noted as active can be stored in a stage debug register 90. Register 90 is any register that can be configured during start up of the processor or computer comprising the processor. The instructions and corresponding stages stored in register 90 are highlighted as part of the output from graphic rendering engine 92. A user input device 94 coupled in communication to computer 38 can allow a user to select a particular instruction for examination.

Upon selection, the processor can be essentially frozen and the current instructions in the pipeline examined on a display screen of computer 38. Prior to freezing sequencing of instruction throughput, the current state of all instructions in the corresponding stages is examined as though the computer were operating in real-time. This will give a true understanding of the processor's performance relative to the sequence of instructions. If relatively few stages (and corresponding instructions) are shown active at that frozen moment in time, then a user might also use the input device to move instructions from one location in sequence to another location in sequence. This will effectively produce a second sequence dissimilar from the first sequence. The second sequence, depending on success of the move, may thereby provide a more efficient instruction throughput.

Various other modifications and alterations in the structure and method of operation of this invention will be apparent to those skilled in the art having the benefit of this disclosure. Although the invention has been described in connection with specific preferred embodiments, it should be understood that the invention as claimed should not be unduly limited to such specific embodiments. It is intended that the following claims define the scope of the present invention, and that the structures and methods within the scope of these claims and their equivalents be covered thereby.

What is claimed is:

1. A graphics rendering engine stored on memory and executable by a computer, the graphics rendering engine comprising:
 source code represented as a first sequence of instruction addresses for display upon a screen accessible to a user, wherein the screen comprises a graphical user interface (GUI) for receiving user input to select one of the instruction addresses;
 a sequence of processor pipeline stages attributable to respective ones of the instruction addresses, wherein the screen displays:
  a breakpoint field that upon receiving the user input:
   selects a particular instruction address within the first sequence of instruction addresses shown in a particular processor pipeline stage of the processor pipeline; and displays all instruction addresses of the first sequence along with corresponding stages of the processor pipeline during a clock cycle in which the particular instruction address is within the particular processor pipeline stage;
  a designator for at least one of the instruction addresses to denote that a corresponding designated instruction address will proceed to a succeeding stage in the processor pipeline during a next clock cycle;
  a non-designator for another at least one instruction address of the first sequence of instruction addresses to denote that a corresponding non-designated instruction address will not proceed to the succeeding stage in the processor pipeline during the next clock cycle; and
  an instruction address field that, upon selection by a user, allows the user to move said another at least one instruction address to a different location within the first sequence of instruction addresses, wherein the instruction address in the instruction address field is selected by activating the breakpoint field to freeze a clock cycle and examine instruction addresses within the processor pipeline; and
 a scheduler that responds to the moved another at least one instruction address to form a second sequence of instruction addresses that has a higher instruction throughput in the processor pipeline than the first sequence of instruction addresses.

2. The graphics rendering engine as recited in claim 1, wherein the screen comprises a pop-up window.

3. The graphics rendering engine as recited in claim 1, wherein the designator is a color that highlights the stage attributable to the at least one instruction that will proceed to the succeeding stage.

4. The graphics rendering engine as recited in claim 3, wherein the color differs depending on which stage is highlighted.

5. The graphics rendering engine as recited in claim 1, wherein the processor pipeline is a pipeline of a superscalar processor where more than one instruction can exist within each stage of the pipeline.

6. The graphics rendering engine as recited in claim 1, wherein the user actuates a pointing device to supply the user input to the GUI for selecting only one of the instruction addresses, wherein in response to said selection, the screen displays the designator over a field bearing a stage name for all of the instruction addresses that will proceed to the next stage in the processor pipeline.

7. A software development tool stored on memory and executable by a computer, the software development tool comprising:
 source code represented as a first sequence of instruction addresses;
 a graphics rendering engine coupled to receive the first sequence of instruction addresses and produce a graphical user interface (GUI) window that includes:
  a breakpoint field that, upon receiving user input via a pointing device:
   selects a particular instruction address within the first sequence of instruction addresses shown in a particular stage of a processor pipeline;
   displays all instruction addresses within the first sequence of instruction addresses along with corresponding stages of the processor pipeline during a clock cycle in which the particular instruction address is within the particular stage;
   assigns a designator to at least one instruction address of the first sequence of instruction addresses to denote that a corresponding designated instruction will proceed to a succeeding stage in the processor pipeline during a clock cycle succeeding the clock cycle; and
   assigns a non-designator to another at least one instruction address of the first sequence of instruction addresses to denote that a corresponding non-designated instruction will not proceed to the succeeding stage in the processor pipeline during the clock cycle succeeding the clock cycle; and
  an instruction address field that, upon selection by a user via the pointing device, allows the user to move said another at least one instruction address to a different location within the first sequence of instruction addresses wherein the instruction address in the instruction address field is selected by activating the breakpoint field to freeze a clock cycle and examine instruction addresses within the processor pipeline; and
 a scheduler that responds to the moved another at least one instruction address to form a second sequence of instruction addresses that has a higher instruction throughput in the processor pipeline than the first sequence of instruction addresses.

8. The software development tool as recited in claim 7, wherein the graphics rendering engine further displays all instructions within the first sequence of instruction addresses and assigns a designator to a number of the instruction addresses of the second sequence of instruction addresses that exceeds a number of the at least one instruction addresses of the first sequence of instruction addresses.

9. The software development tool as recited in claim 7, wherein the second sequence of instruction addresses requires fewer clock cycles through the processor pipeline than the first sequence of instruction addresses.

10. The software development tool as recited in claim 7, wherein the window comprises a pop-up window rendered upon a computer display screen.

11. The software development tool as recited in claim 7, wherein the designator is a color that highlights the stage attributable to the at least one instruction address that will proceed to the succeeding stage.

12. The software development tool as recited in claim 11, wherein the color differs depending on which stage is highlighted.

13. The software development tool as recited in claim 7, wherein the processor pipeline is a pipeline of a superscalar processor where more than one instruction can exist within each stage of the pipeline.

14. The software development tool as recited in claim 7, wherein the user actuates the pointing device to select the particular instruction address and, in response thereto, the window displays the designator over a stage number field bearing a stage name for all of the first sequence of instruction addresses that will proceed to the succeeding stage in the processor pipeline.

15. A method for displaying progression of instruction addresses through a processor pipeline, comprising:
- selecting a breakpoint within a breakpoint column of a display screen, via user input at a breakpoint location on the display screen, to select:
  - an instruction address of a first sequence of instruction addresses representing source code within the same line as the breakpoint, wherein the instruction address is located in an instruction address field, and
  - a clock cycle associated with the selected instruction address being in a particular stage within a processor pipeline;
- designating all instruction addresses of the first sequence of instruction addresses within the processor pipeline that will proceed to a succeeding stage of the processor pipeline;
- not designating all instruction addresses of the first sequence of instruction addresses within the processor pipeline that will not proceed to the succeeding stage of the processor pipeline, wherein upon selection by a user, the instruction addresses not designated to proceed are moved to a different location within the first sequence of instruction addresses; wherein the instruction address in the instruction address field is selected by activating the breakpoint column to freeze a clock cycle and examine instruction addresses within the processor pipeline; and
- forming by a scheduler a second sequence of instruction addresses that has a higher instruction throughput in the processor pipeline than the first sequence of instruction addresses in response to the moved instruction addresses.

16. The method as recited in claim 15, wherein said designating comprises receiving a signal from a stage debug register by a graphics rendering engine to denote that the instruction addresses being designated will proceed to the succeeding stage of the processor pipeline.

17. The method as recited in claim 15, wherein said designating comprises checking resources of a processor to determine if the instruction addresses will be allowed to proceed and, if so, sending a signal from a debug register that stores the checking outcome to designate the instruction addresses that have corresponding resources available to allow such instruction addresses to proceed.

18. The method as recited in claim 15, wherein said designating comprises highlighting the designated instruction addresses with a color different from the background color of the display screen.

19. The method as recited in claim 15, wherein said designating comprises highlighting the stage corresponding to the designated instruction addresses with a color, and wherein the color differs depending on which stage is highlighted.

* * * * *